United States Patent [19]

Seeders

[11] Patent Number: 5,304,011
[45] Date of Patent: Apr. 19, 1994

[54] WEDGELOCK LAMINATED JOINT

[76] Inventor: Jon Seeders, 1080 A 14th St., Arcata, Calif. 95521

[21] Appl. No.: 834,144

[22] Filed: Feb. 10, 1992

[51] Int. Cl.⁵ .............................................. F16B 2/14
[52] U.S. Cl. ................... 403/253; 403/240; 403/231; 403/263; 403/374; 403/381; 403/382
[58] Field of Search ............... 403/381, 382, 263, 374, 403/240, 247, 230, 231, 253; 52/642, 253

[56] References Cited

U.S. PATENT DOCUMENTS

| | | | |
|---|---|---|---|
| 1,098,405 | 6/1914 | Reinecke | 403/382 X |
| 2,967,332 | 1/1961 | Donlin | 52/642 X |
| 3,285,636 | 11/1966 | Hoyle, Jr. | 52/642 X |

FOREIGN PATENT DOCUMENTS

| | | | |
|---|---|---|---|
| 917390 | 9/1954 | Fed. Rep. of Germany | 403/263 |
| 195862 | 4/1923 | United Kingdom | 403/240 |
| 2188692 | 10/1987 | United Kingdom | 403/231 |

OTHER PUBLICATIONS

Article titled How To Build A Small Table The Japanese Way, pp. 62, 63, 64 in publication "MI".
The Circle of the Mechanical Arts by Thomas Martin 1813 An Article Therein On Carpentry and Joinery FIG. 19, FIG. 1.

*Primary Examiner*—Randolph A. Reese
*Assistant Examiner*—Christopher J. Novosad

[57] ABSTRACT

A wedgelock laminated joint is an integral building connection allowing the rapid, accurate, secure jointing of a structural joist with a vertical post. A lock notch is mated by sliding a joist beam tongue through a central receptacle within a post beam until tightly mated, and then secured by placing a wedge into a keyway, which is an upper portion of the post receptacle, and tapping it snugly into the wedge keyway. This creates a sturdy nail free fastening of the floor joist and vertical wall post, easily fastened or unfastened, held fast only by the wedge which is finally secured with a set screw after all the desired number of rib sections are erected, trued and horizontally connected.

1 Claim, 1 Drawing Sheet

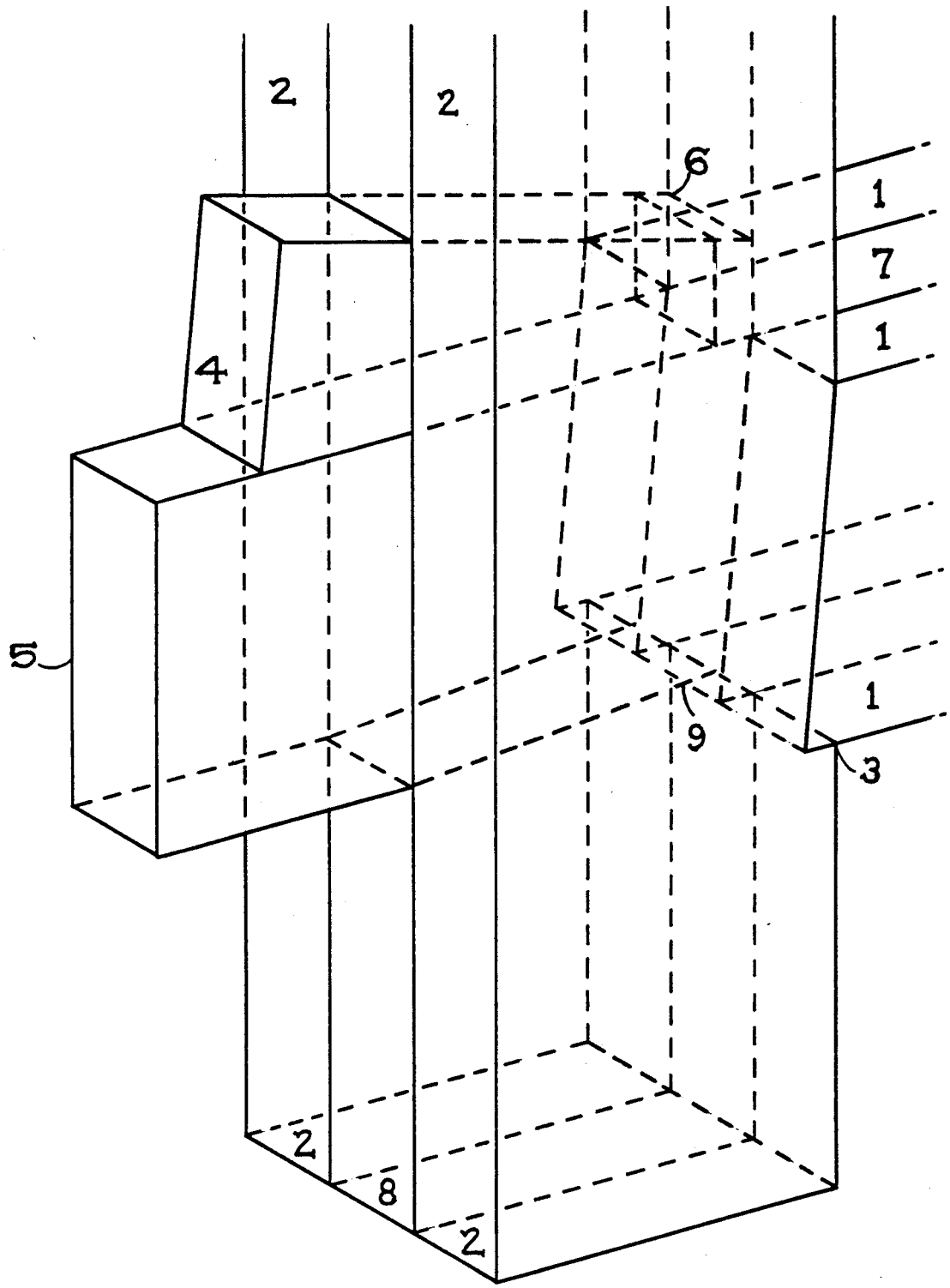

WEDGELOCK LAMINATED JOINT

BACKGROUND OF THE INVENTION

On numerous occasions while engaged in experimental aquaculture research and development, there were applications for durable, sturdy, and easily relocatable structures of various sizes. There were no structures like this available. I designed numerous such structures using various means of construction. The use of bolts and brackets were the only readily existing structural fastening methods available for such structures. The harsh, wet and corrosive environment made the use of anything but very expensive structural fiberglass and/or stainless steel bracketing and fastening impractical. I researched old boatbuilding and carpentry methods and found a practical method used by ancient oriental woodworkers who fashioned interlocking joints from large slow growth timbers. The straight tight graining of these old growth trees allowed for the careful and time consuming chiseling out of internal mortise locking joints. The most functional of these were complex and needed the skill of highly trained carpenters as an integral requirement. I discovered that I could directly fabricate locking joints, from available lumber stocks, by sandwiching lock notches and keyways into laminated post and beams.

SUMMARY OF THE INVENTION

This invention allows the use of lower grade lumber and the use of open saw cuts rather than drilling and hand chiseling or the use of elaborate large mortising machines not readily available or cost effective. Laminating adds strength, stability and lower material cost by using more available lumber stocks with less waste and the ease of handling sized lumber. Furthermore the use of this invention allows for the disassembly and portability of structures too large to normally transport upon streets and highways. These structures also lend themselves to be packaged and readily shipped and/or airlifted for temporary or permanent installation in remote locations. The structural framework can be shipped and readily available local materials can be used to finish these structures based on site specific conditions. These structures lend themselves to a wide range of finishes from low cost basics to limitless refined amenities. The Wedgelock designs are readily adaptable to new materials technologies from precast molding to the new remanufactured wood fiber processes and poly lamination of metallic, synthetic and recycled materials.

BRIEF DESCRIPTION OF THE DRAWINGS

The single figure of the drawing is an isometric view of a typical post to floor joist connection.
(1) Exterior Joist Laminations
(2) Exterior Post Laminations
(3) Post Shelf Notch
(4) Wedge
(5) Joist Center Laminated Beveled Notch Tongue [ An unbroken continuous extension of (7). ]
(6) Post Wedge Keyway
(7) Joist Center Lamination
(8) Post Center Lamination Sections
(9) Lock Notch

DETAILED DESCRIPTION OF THE INVENTION

The drawing is an isometric view of a typical post to floor joist connection. The sections marked as follows: (1) are the Exterior Joist Laminations and identify the outer laminations of the interior floor joist beams. (2) identifies the Post Exterior Laminations which are notched on their interior side to match the bevel on the ends of the Exterior Joist Laminations (1) which are angled longer on their bottom edge so as to rest on and match the Post Shelf Notch (3). This device securely transfers the floor loads to the post with innate seismic resistance. The Wedge (4) is used to bind the Tongue (5) into the Wedge Keyway (6) after the notch in the end of the Joist Center Lamination (7) coincides with the Lock Notch 9, which is formed by the bevelled surface on post center lamination section 8, exterior post lamination 2 and post shelf notch 3, visually apparent at the exterior seam joint (between 1 & 2). After the post and beam rib frames are erected, trued and secured by bracing or sheathing, the wedges of all the joint connections are uniformly set with a tuning hammer and then secured with set screws through the Exterior Post Laminations (2) into the Wedges (4). The framework fabrication is then complete. Disassembly is the reverse and is exceptionally quick and efficient.

There are numerous variations which could be applied to this invention. The laminations could be built with peeler skins or fabricated from plywood, wafer board, or other composite materials. The crushing of wood fibers and the use of alternative fibers together with various adhesives binders could include fire retardant recycled materials injected into molds. Forming up these members is an alternative to the sole use of traditional lumber, helping to reduce demand on the dwindling forest and landfills while producing safer and more durable construction materials.

I claim:

1. A wedgelock laminated joint for joining a structural joint to a vertical post held secure by a wedge in building structures comprising:
   a vertical post member, said vertical post member comprising a plurality of substantially vertical post center lamination sections, and
      a pair of exterior post laminations, wherein said vertical post center lamination sections are located intermediate said pair of exterior post laminations, and
   wherein one of said vertical post center laminations is located substantially adjacent another of said vertical post center laminations so as to form an aperture in the form of a wedge-shaped keyway, and
   wherein said wedge-shaped keyway is defined by interior portions of said pair of exterior post laminations and interior portions of said vertical post center lamination sections, and
   wherein an interior portion of one of said vertical post center lamination sections defines a lock notch, said lock notch comprising a beveled surface on an interior surface of said one of said vertical post center lamination sections, and
   wherein said lock notch further comprises a post notch on an interior surface of said one of said vertical post center lamination sections, said post notch comprising a substantially horizontal planar surface in substantial abutment with a vertical planar surface, wherein said vertical planar surface is in substantial abutment with said beveled surface, wherein said another of said vertical post center lamination sections comprises an interior surface defining said aperture in which said interior surface of said another of said vertical post center lamination sections is bevelled, the joint further comprising a joist member, said joist member comprising a substantially horizontal joist center lamination having an end surface, and a pair of substantially horizontal exterior joist laminations having end surfaces, wherein said joist center lamination is located intermediate said pair of exterior joist lamination that said end surface of said joist laminations such may protrude from said end surfaces of said pair of exterior joist laminations, wherein said end surfaces of said pair of exterior joist laminations are bevelled, and wherein a portion of said horizontal joist center lamination is beveled to correspond with and to rest on said bevelled surface on said interior surface of one of said vertical post center lamination sections, and wherein said joist center lamination and said pair of exterior joist laminations are adapted to rest on said post notch, the joint further comprising a wedge member adapted to fit into said wedge-shaped keyway, said wedge member comprising a first bevelled outer surface adapted to contact a bevelled interior surface of said another of said vertical center lamination sections, and the wedge member comprising a second surface adapted to contact said horizontal joist center lamination.

* * * * *